(12) United States Patent
Wipfel et al.

(10) Patent No.: US 9,736,026 B2
(45) Date of Patent: Aug. 15, 2017

(54) TECHNIQUES FOR CLOUD CONTROL AND MANAGEMENT

(71) Applicant: Micro Focus Software Inc., Provo, UT (US)

(72) Inventors: Robert A. Wipfel, Draper, UT (US); Stephen R Carter, Spanish Fork, UT (US); Carolyn B. McClain, Springville, UT (US)

(73) Assignee: Micro Focus Software Inc., Provo, UT (US)

( * ) Notice: Subject to any disclaimer, the term of this patent is extended or adjusted under 35 U.S.C. 154(b) by 15 days.

(21) Appl. No.: 14/609,748

(22) Filed: Jan. 30, 2015

(65) Prior Publication Data
US 2015/0207684 A1    Jul. 23, 2015

Related U.S. Application Data

(63) Continuation of application No. 12/608,427, filed on Oct. 29, 2009, now Pat. No. 8,966,017.

(60) Provisional application No. 61/224,206, filed on Jul. 9, 2009.

(51) Int. Cl.
*G06F 15/177* (2006.01)
*H04L 12/24* (2006.01)
*G06F 17/30* (2006.01)
*H04L 12/911* (2013.01)
*H04L 29/06* (2006.01)

(52) U.S. Cl.
CPC .... *H04L 41/0893* (2013.01); *G06F 17/30067* (2013.01); *G06F 17/30082* (2013.01); *G06F 17/30563* (2013.01); *H04L 47/782* (2013.01); *H04L 63/20* (2013.01)

(58) Field of Classification Search
CPC ... H04L 63/20; H04L 41/0893; H04L 47/782; G06F 17/30067; G06F 17/30082; G06F 17/30563
USPC ............... 709/203, 219, 220; 707/694, 756; 718/1; 726/1
See application file for complete search history.

(56) References Cited

U.S. PATENT DOCUMENTS

| | | | |
|---|---|---|---|
| 5,797,128 A | * | 8/1998 | Birnbaum ................. G06F 9/50 |
| 6,064,656 A | | 5/2000 | Angal et al. |
| 6,266,694 B1 | | 7/2001 | Duguay et al. |
| 6,671,728 B1 | | 12/2003 | Mayberry |
| 6,880,002 B2 | | 4/2005 | Hirschfeld et al. |

(Continued)

OTHER PUBLICATIONS

U.S. Appl. No. 12/608,427, filed Oct. 29, 2009, Techniques for Cloud Control and Management.

(Continued)

*Primary Examiner* — Frantz Jean
(74) *Attorney, Agent, or Firm* — Schwegman Lundberg & Woessner, P.A.

(57) ABSTRACT

Techniques for cloud control and management are provided. The control, creation, and management of workloads in distributed infrastructures are coordinated via a master Configuration Management Database (CMDB). The master CMDB is also used to unify the multiple distributed infrastructures so that the workloads are rationalized. Moreover, data centers are coordinated with the distributed infrastructures so the configuration settings and policies included in the master CMDB are enforced and synchronized throughout the network.

20 Claims, 4 Drawing Sheets

(56) References Cited

U.S. PATENT DOCUMENTS

| | | | |
|---|---|---|---|
| 7,219,142 B1 | 5/2007 | Parekh et al. | |
| 7,272,625 B1* | 9/2007 | Hannel | H04L 63/0218 709/200 |
| 7,401,104 B2 | 7/2008 | Shah et al. | |
| 7,440,981 B2 | 10/2008 | Novik et al. | |
| 7,574,496 B2 | 8/2009 | McCrory et al. | |
| 7,995,498 B2 | 8/2011 | Andrews et al. | |
| 8,078,707 B1* | 12/2011 | Watsen | H04L 41/28 709/223 |
| 9,450,783 B2* | 9/2016 | DeHaan | G06F 9/541 |
| 2001/0007133 A1 | 7/2001 | Moriconi et al. | |
| 2002/0016777 A1 | 2/2002 | Seamons et al. | |
| 2002/0147801 A1 | 10/2002 | Gullotta et al. | |
| 2003/0131232 A1 | 7/2003 | Fraser et al. | |
| 2005/0086272 A1 | 4/2005 | Novik et al. | |
| 2005/0193222 A1 | 9/2005 | Greene | |
| 2006/0225062 A1* | 10/2006 | Lamb | G06F 9/541 717/162 |
| 2006/0230076 A1 | 10/2006 | Gounares et al. | |
| 2007/0039053 A1 | 2/2007 | Dvir | |
| 2007/0234365 A1* | 10/2007 | Savit | G06F 9/505 718/104 |
| 2007/0255854 A1 | 11/2007 | Khosravy et al. | |
| 2008/0080552 A1 | 4/2008 | Gates et al. | |
| 2008/0127327 A1 | 5/2008 | Carrasco | |
| 2009/0034738 A1 | 2/2009 | Starrett | |
| 2009/0198702 A1 | 8/2009 | Novik et al. | |
| 2009/0228967 A1 | 9/2009 | Gbadegesin et al. | |
| 2009/0241166 A1 | 9/2009 | Thurm et al. | |
| 2009/0249439 A1 | 10/2009 | Olden et al. | |
| 2009/0287762 A1 | 11/2009 | Gopal et al. | |
| 2010/0115272 A1 | 5/2010 | Batta | |
| 2010/0128879 A1 | 5/2010 | Zou et al. | |
| 2010/0235355 A1 | 9/2010 | Carter et al. | |
| 2010/0235887 A1 | 9/2010 | Burch et al. | |
| 2011/0010339 A1 | 1/2011 | Wipfel et al. | |
| 2011/0247079 A1 | 10/2011 | Candelore | |

OTHER PUBLICATIONS

U.S. Appl. No. 12/608,427, Non Final Office Action mailed Mar. 1, 2013, 24 pgs.

U.S. Appl. No. 12/608,427 , Response filed Jun. 3, 2013 to Non Final Office Action mailed Mar. 1, 2013.

U.S. Appl. No. 12/608,427, Final Office Action mailed Sep. 25, 2013, 21 pgs.

U.S. Appl. No. 12/608,427, Response filed Dec. 2, 2013 to Final Office Action mailed Sep. 25, 2013, 10 pgs.

U.S. Appl. No. 12/608,427, Non Final Office Action mailed Dec. 18, 2013, 21 pgs.

U.S. Appl. No. 12/608,427, Response filed Mar. 18, 2014 to Non Final Office Action mailed Dec. 18, 2014, 10 pgs.

U.S. Appl. No. 12/608,427, Final Office Action mailed Jul. 8, 2014, 21 pgs.

U.S. Appl. No. 12/608,427, Response filed Sep. 8, 2014 to Final Office Action mailed Jul. 8, 2014, 9 pgs.

U.S. Appl. No. 12/608,427, Advisory Action mailed Sep. 23, 2014, 3 pgs.

U.S. Appl. No. 12/608,427, Notice of Allowance mailed Oct. 24, 2014, 8 pgs.

* cited by examiner

TECHNIQUES FOR CLOUD CONTROL AND MANAGEMENT

RELATED APPLICATIONS

This application is a continuation of U.S. patent application Ser. No. 12/608,427, filed on Oct. 29, 2009, which claims the benefit of priority under 35 U.S.C. 119(e) to U.S. Provisional Application Ser. No. 61/224,206; entitled: "System and Method for Cloud Control and Management," and filed on Jul. 9, 2009, each of which is incorporated herein by reference in its entirety.

BACKGROUND

Enterprises are finding it increasingly difficult to stay abreast with the rapidly evolving technology platforms. That is, software and hardware upgrades are commonplace for an information technology (IT) infrastructure of an enterprise and maintaining a state of the art infrastructure is costly, time consuming, and distracts from the business of an enterprise. But, there is no avoiding technology and the enterprise's business is intimately dependent on its underlying infrastructure. So, an enterprise is in a catch-22 position and is forced to maintain a costly IT infrastructure.

To remedy these concerns a new technology has been gaining acceptance in the industry. This technology is referred to as "cloud computing." The term "cloud" is used as a metaphor for how the Internet is depicted in diagrams and is used as an abstraction of the underlying infrastructure, which is being concealed with cloud computing. Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction.

With cloud computing and cloud storage, enterprises are recognizing an economy of scale in migrating portions of their data centers to various cloud providers. Infrastructure as a Service (IaaS) is currently the most common mechanism for providing cloud computing and storage. Software as a Service (SaaS) and Platform as a Service (PaaS) are focused more on providing specific services or specific platform services rather than raw infrastructure.

Additionally, regulatory compliance is a critical part of today's enterprise operations. Information Technology Infrastructure Library (ITIL) is fast becoming the best practice model for enterprises to manage their risk and compliance throughout their data centers and other business processes.

These regulatory concerns have become a road block to enterprise acceptance of cloud computing. The enterprise wants more control and management capabilities of any partial or full cloud implementation within the enterprise because without such assurances, the enterprise may: run afoul with regulatory agencies, unduly expose the enterprise to liability, and even jeopardize valued customer relationships.

Thus, improved techniques for cloud control and management are needed.

SUMMARY

In various embodiments, techniques for cloud control and management are presented. More specifically, and in an embodiment, a method for cloud control and management is provided. Specifically, a master configuration management database (CMDB) with master configuration settings and master policies is configured for construction, management, and deployment of workloads assigned to distribute computing resources of a network. Next, a plurality of sub CMDB's is interfaced with a master CMDB to coordinate sub configuration settings and sub policies with the master configuration settings and the master policies of the master CMDB. Each sub CMDB controlling a particular set of the computing resources; each set of the computing resources defining a particular distributed computing infrastructure.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" defines processing loads, memory loads, storage loads, and processing capabilities for a processing environment.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

A "data center" may be viewed as a processing environment for an enterprise. The data center can include, in some instances, multiple processing environments. The data center may contiguously reside within an internally controlled network of the enterprise or the data center may be distributed logically over internal and external network connections. In an embodiment, a data center includes just a certain type of computing resource, such as storage, and other aspects of the data center used for processing are acquired via another remote processing environment. So, the data center does not have to be self-contained, the data center can borrow or share resources with other processing environments.

A "Configuration Management Database" (CMDB) is a repository of information related to all the components of a processing environment or a set of different distributed processing environments. The CMDB includes configuration settings for the computing resources of a particular processing environment or a set of processing environments. The configuration settings include attributes and relationships for each computing resource and between the computing resources. For example, a configuration setting may state that within processing environment X, computing resource Y and Z are to communicate using Protocol P, where Y and Z define a relationship and P is an attribute of that relationship.

The CMDB also includes policies for the computing resources and processing environments. Policies include conditions and actions. For example, one policy may state a condition defined as "when resource X is accessed" perform an action defined as "log information related to the access in resource Y." Policies can be hierarchical, such that a higher-level policy trumps a lower-level policy when conflicts between policies occur.

It is noted that just because the "CMDB" includes the word database, this is not to imply that the CMDB has to be a relational database or any database for that matter. That is, the CMDB can be any repository of information where that repository can be directory based, database based, file based, table based, or a combination of some or all of these things.

Various embodiments of this invention can be implemented in existing network architectures. For example, in some embodiments, the techniques presented herein are implemented in whole or in part in the Novell® network and proxy server products, operating system products, directory-based products and other products distributed by Novell®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
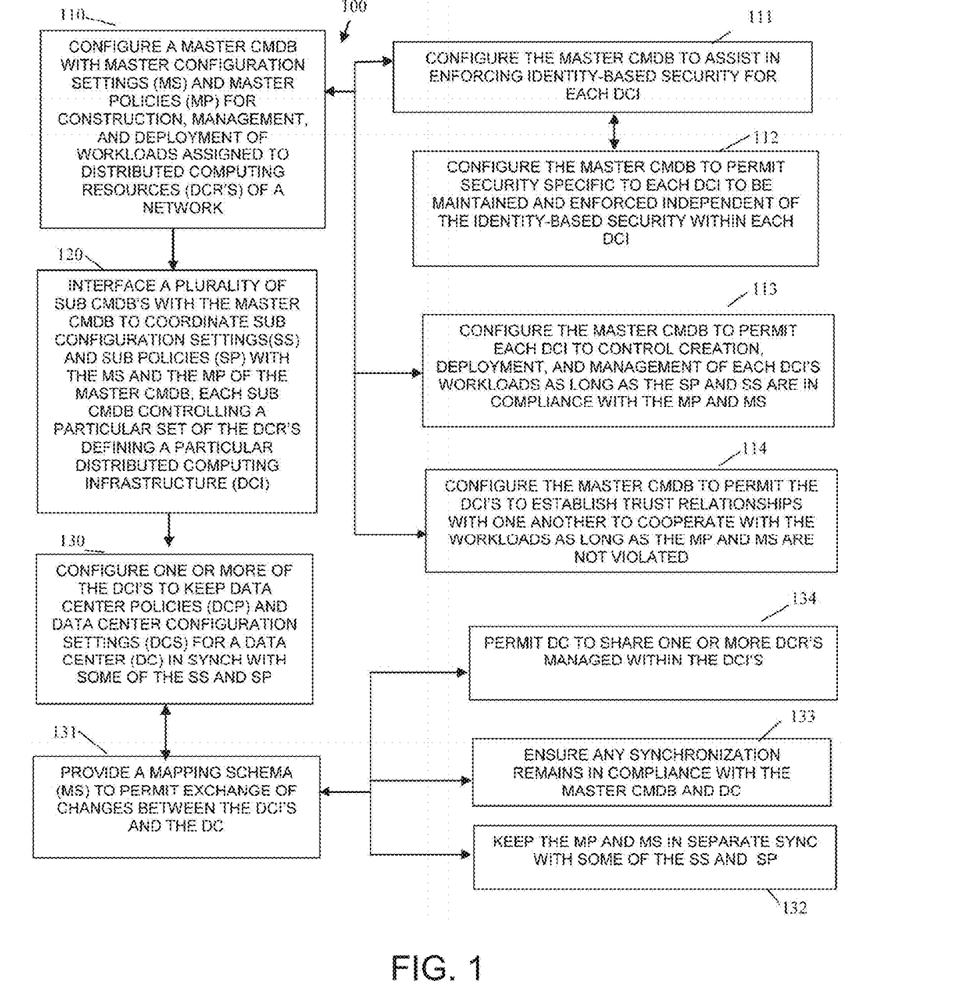
FIG. 1 is a diagram of a method for cloud control and management, according to an example embodiment.

FIG. 1 is a diagram of a method 100 for cloud control and management, according to an example embodiment. The method 100 (hereinafter "CMDB compliance service") is implemented in a machine-accessible and computer-readable medium and instructions that execute on one or more processors (machines, computers, processors, etc.). The machine is specifically configured to process the business intelligence service. Furthermore, the CMDB compliance service is operational over and processes within a network. The network may be wired, wireless, or a combination of wired and wireless.

At 110, the CMDB compliance service configures a master CMDB with master configuration settings and master policies for the construction (creation), management, and deployment of workloads assigned to distributed computing resources of the network. In some cases, the master configuration settings and master policies are that which are assigned or defined by an IaaS provider. In other cases, the master configuration settings and master policies at least partially include that which is assigned, required, or defined by the IaaS. In still more cases, the entire master configuration settings and master policies are independent of any particular IaaS and may be associated with and/or assigned by an enterprise.

According to an embodiment, at 111, the CMDB compliance service further configures the master CMDB to assist in identity-based security for each distributed computing infrastructure (discussed below with reference to the processing at 120). Here, Cloud Security Service (CSS) can be enforced via the master CMDB. In some cases, the identity-based security is acquired and managed via a third-party identity service that has access to or is at least partially synchronized with the master CMDB.

Continuing with the embodiment of 111 and at 112, the CMDB compliance service configures the master CMDB to permit security that is specific to each distribute computing infrastructure to be independently maintained and enforced by each DCI. Here, more limited security desired by each DCI can be permitted to be maintained on each DCI; however, if a particular DCI attempts to broaden access rights beyond that which is defined in the master CMDB then such a situation is not permitted unless a policy of the CMDB so permits.

In an embodiment, at 113, the CMDB compliance service configures the master CMDB to permit each DCI to control the creation, deployment, and management of each distributed computing infrastructure's workloads as long as the sub policies and sub configuration settings (discussed below with reference to the processing at 120) remain in compliance with the master configuration settings and the master policies. So, each DCI can also independently manage and control their own workloads providing such management and control does not conflict with the master CMDB.

In another situation, at 114, the CMDB compliance service configures the master CMDB to permit the distributed computing infrastructures to establish trust relationships (secure communication and authentication) with one another for purposes of cooperating with workload management and control as long as the master configuration settings and the master policies are not violated. So, independence in relationships and sharing among the distributed computing infrastructures are capable so long as compliance enforced in the master CMDB is maintained.

At 120, the CMDB compliance service interfaces a plurality of sub CMDB's with the master CMDB to coordinate sub configuration settings and sub policies with the master configuration settings and the master policies of the master CMDB. Each sub CMDB controls a particular set of the distributed computing resources and each set defines a particular distributed computing infrastructure (distributed processing environment). So, a plurality of distributed processing environments (cloud infrastructure) maintains their own independent sub CMDB. The sub CMDB's are coordinated with the master CMDB to maintain compliance defined in the master configuration settings and the master policies of the master CMDB.

According to an embodiment, at 130, the CMDB compliance service further configures one or more of the distributed computing infrastructures to keep some of their sub policies and some of their sub configuration settings for their sub CMDB's in synchronization with data center policies and data center configuration settings for a data center. Here, the data center may itself maintain and manage a data center CMDB that has the data center policies and data center configuration settings. It is noted that data center CMDB may be associated with enterprise policy, whereas the master CMDB is associated with IaaS provider policies. Selective information between the sub CMDB's and the data center CMDB are synchronized and separately and independent other information between the sub CMDB's and the master CMDB are synchronized. On confliction situations, audits events are emitted and/or changes are not permitted. So, essentially both an enterprise and an IaaS provider control the distributed computing infrastructure environments (mini-clouds).

Continuing with the embodiment of 130 and at 131, the CMDB compliance service provides a mapping schema to permit the exchange of changes occurring in the sub policies, sub configuration settings, data center policies, and data center configuration settings with the one or more distributed computing infrastructures and the data center. The sub policies, and sub configuration settings may be in a different format from that which is associated with the data center policies and the data center configuration settings. Thus, disparate formats maintained in disparate CMDB's are synchronized via a mapping schema.

Continuing with the embodiment of 131 and at 132, the CMDB compliance service keeps the master configuration settings and the master policies in synchronization with some of the sub configuration settings, some of the sub policies of the one or more distributed computing infrastructures. In other words, the master CMDB, the sub CMDB's, and the data center CMDB are partially coordinated with one another in an automated and dynamic fashion. This is done separate and independent of the partially coordination between the sub CMDB's and the data center CMDB.

In another case of the embodiment at 131 and at 133, the CMDB compliance service ensures that the synchronization between the one or more distributed computing infrastructures and the master CMDB or separate synchronization between the one or more distributed computing infrastructures and the data center CMDB remain in compliance with the master configuration settings and the master policies of the master CMDB and in compliance with the data center policies and data center configuration settings. Here, the master CMDB and the data center CMDB each separate controls, monitors, and ensures compliance of the mini-cloud infrastructures overlaid on the network.

In yet another situation of the embodiment at 131 and at 132, the CMDB compliance service permits the data center to share one or more computing resources managed within the one or more distributed computing infrastructures. So, resources lacking in the data center are acquired via the one or more distributed computing environments.

Figure 4:
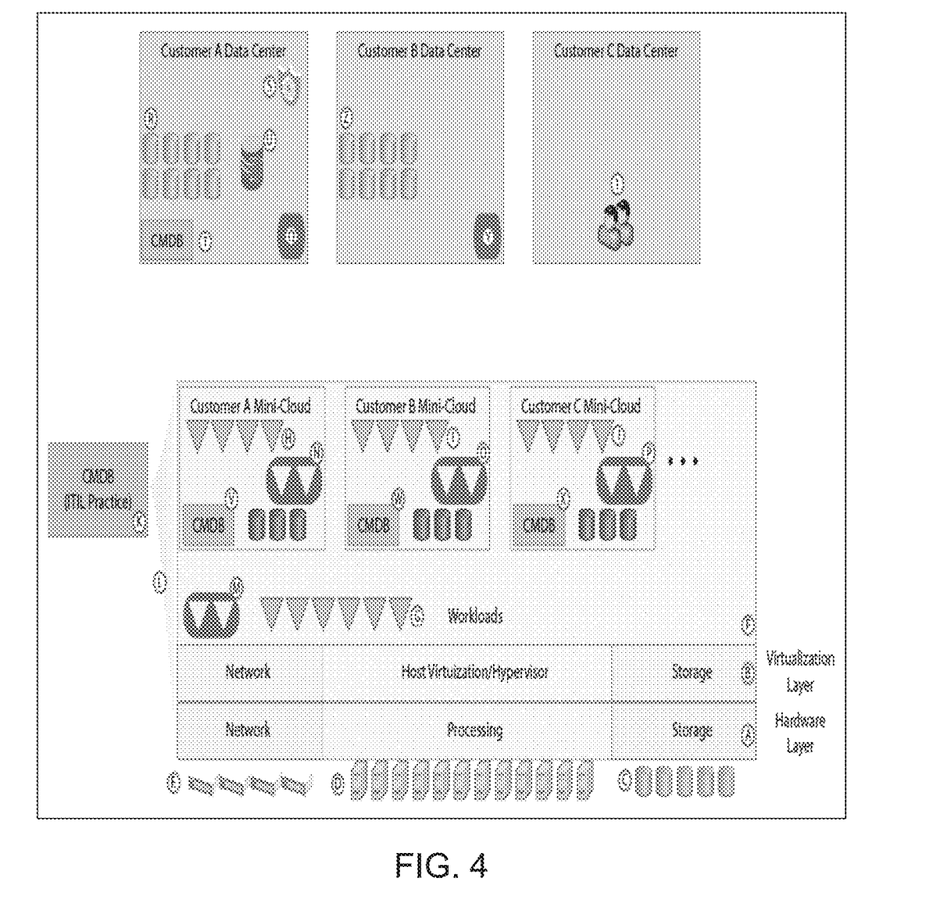
FIG. 4 is a diagram depicting interactions between components of a cloud control management system, according to an example embodiment.

It is noted that the data center and its CMDB along with the master CMDB both independently and separately serve as controlling entities for their configuration settings and policy. So, any changes in the data center CMDB are synchronized with the CMDB's associated with each of the distributed computing infrastructures, but such a change is not propagated back to the master CMDB. Furthermore, changes in the master CMDB are synchronized with the CMDB's of the distributed computing infrastructures (mini-clouds as depicted in FIG. 4 discussed below), but such a change is not propagated back to the data center CMDB. Also, should a change violate what is defined in the data center CMDB or the master CMDB, then an audit event can be generated and the change not permitted. So, although synchronization takes place between either the distribute computing infrastructure and the data center or the distributed computing infrastructure and the master CMDB, changes in these relationship interactions are not permitted when a violation occurs in either the master CMDB or the data center CMDB.

Figure 2:
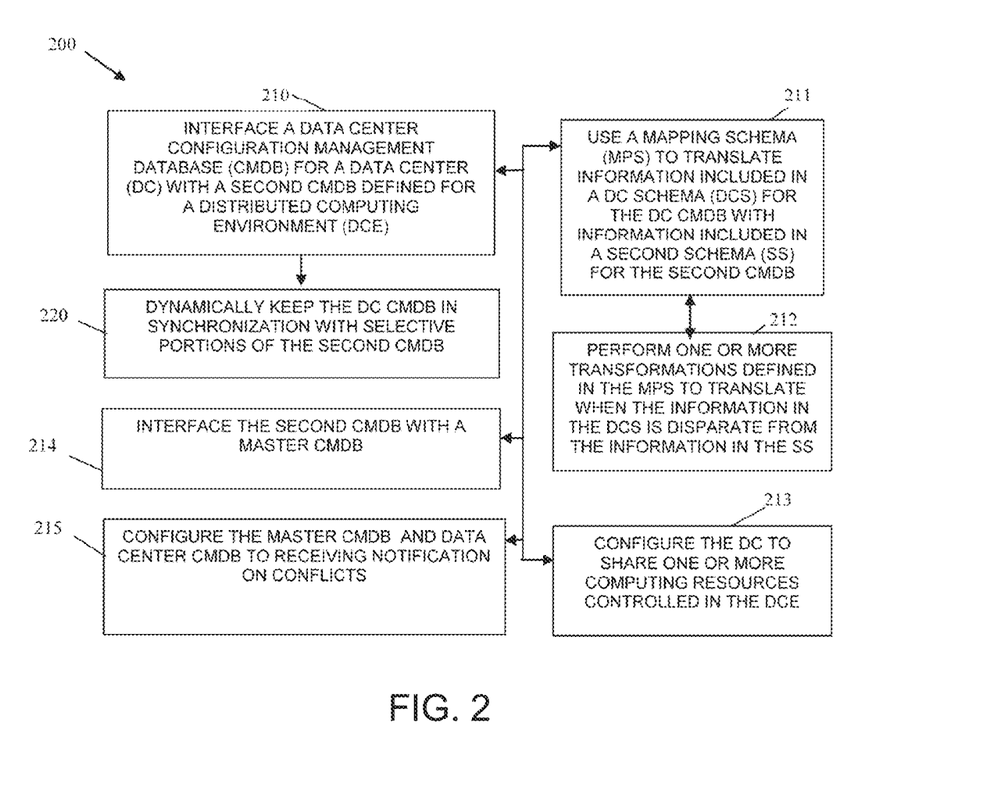
FIG. 2 is a diagram of another method for cloud control and management, according to an example embodiment.

FIG. 2 is a diagram of another method 200 for cloud control and management, according to an example embodiment. The method 200 (hereinafter "distributed infrastructure unifying service") is implemented in a machine-accessible and computer-readable storage medium as instructions that execute on one or more processors of a network node. The distributed infrastructure unifying service is operational over a network. The network may be wired, wireless, or a combination of wired and wireless. Furthermore, the processor is specifically configured to process the distributed infrastructure unifying service.

At 210, the distributed infrastructure unifying service interfaces a data center CMDB with a second CMDB defined for a distributed computing environment over the network. This is achieved in a variety of manners and includes a variety of beneficial features.

For example, at 211, the distributed infrastructure unifying service uses a mapping schema to translate information included in a data center schema for the data center CMDB with information included in a second schema for the second CMDB. This was discussed above with reference to the method 100 of the FIG. 1.

Continuing with the embodiment of 211 and at 212, the distributed infrastructure unifying service also performs one or more transformations defined in the mapping schema to translate and convert information when the information in the data center schema is disparate or different from the information in the second schema. Here, this can include first normalizing the disparate information to a format defined in the mapping schema and then translating from the normalized information to a specific format desired or needed in either the data center schema or the second schema.

According to an embodiment, at 213, the distributed infrastructure unifying service also configures the data center to share one or more computing resources controlled in the distributed computing environment. So, the data center may just include processing resources and storage resources are borrowed or shared with some of the distributed computing environments. Another case may be that the data center just includes storage resources and processing resources are borrowed or shared with some of the distributed computing resources. It is noted, that in some cases the data center may have each type of desired computing resource but needs to expand based on capacity to borrow or share that type of resource from one of the distributed computing environments.

In another situation, at 214, the distributed infrastructure unifying service interfaces the second CMDB with a master CMDB. This case was discussed at length above with reference to the method 100 of the FIG. 1.

Continuing with the embodiment of 214 and at 215, the distributed infrastructure unifying service also configures the master CMDB and the data center CMDB to receive notifications on conflicts that occur with the synchronization between the master CMDB and the second CMDB (report to the data center) and separately and independent conflicts that occur with the synchronization between the second CMDB and the data center CMDB (report to the IaaS provider).

The master CMDB may be viewed as a CMDB provided by an IaaS provider to control mini-cloud infrastructures for compliance, such as operational compliance and identified as K in FIG. 4, discussed below. The data center CMDB may be viewed as a CMDB for an enterprise where the enterprise is separately enforcing regulatory compliance; this CMDB is identified as T in FIG. 4, discussed below. The second CMDB may be viewed as each mini-clouds CMDB that is kept in separate synchronization with both the data center CMDB and the IaaS CMDB; there can be a plurality of these second CMDB's, these CMDB's are identified as V, W, and X in FIG. 4, discussed below.

At 220, the distributed infrastructure unifying service dynamically keeps the data center CMDB in selective synchronization with portions of the second CMDB. So, an enterprise associated with the data center CMDB can ensure compliance of enterprise policy on the mini-cloud (second CMDB processing environment). It is noted, that a separate master CMDB associated with an IaaS provider of the second CMDB and other mini-clouds can also keep selective portions of the second CMDB in synchronization with the master CMDB. So, both the enterprise and the IaaS provider have control over the mini-cloud. Conflicts with changes in the mini-cloud (second CMDB environment) and the master CMDB or the data center CMDB can cause an auditing event and may in some cases be entirely prohibited according to global policy.

Figure 3:
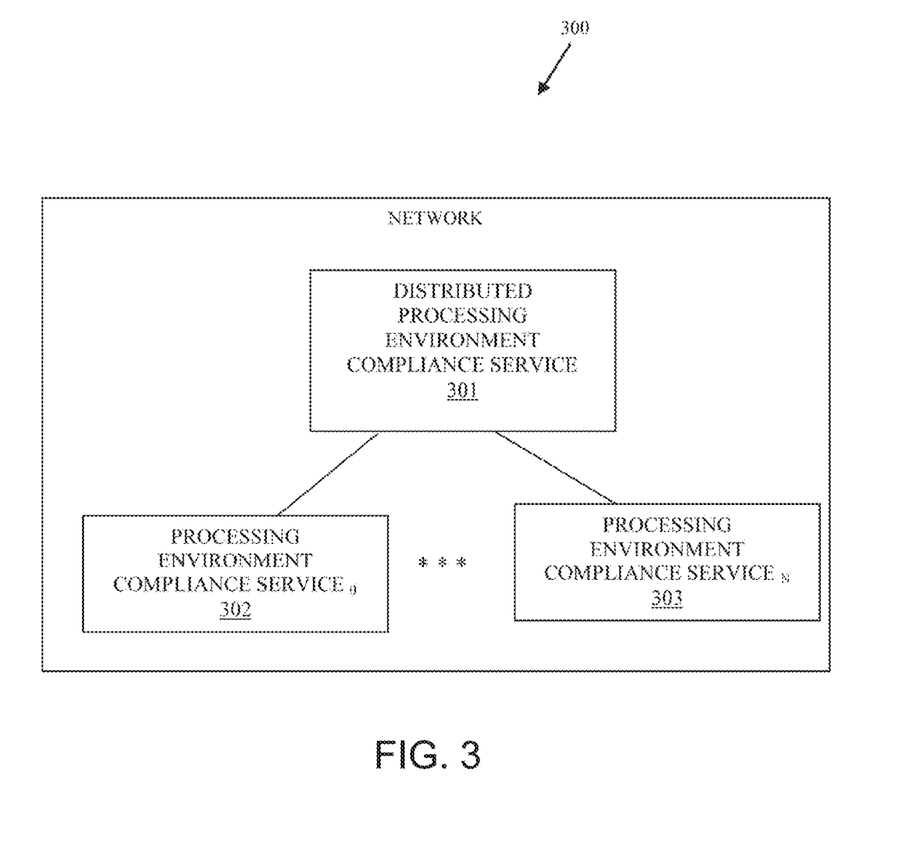
FIG. 3 is a diagram of a cloud control management system, according to an example embodiment.

FIG. 3 is a diagram of a cloud control management system 300, according to an example embodiment. The cloud control management system 300 is implemented in a machine-accessible and computer-readable storage medium as instructions that execute on one or more processors (multi-processor) and that is operational over a network. The one or more processors are specifically configured to process the components of the cloud control management system 300. Moreover, the network may be wired, wireless, or a combination of wired and wireless. In an embodiment, the cloud control management system 300 implements, among other things, certain aspects of the methods 100 and 200 represented by the FIGS. 1 and 2, respectively.

The cloud control management system 300 includes a distributed processing environment compliance service 301 and a plurality of processing environment compliance services 302. Each of these and their interactions with one another will now be discussed in turn.

The distributed processing environment compliance service 301 is implemented within and resides within a computer-readable storage medium and is to process on one or more processors of the network. Example aspects of the distributed processing environment compliance service 301 were presented in detail with reference to the methods 100 and 200 of the FIGS. 1 and 2, respectively.

The distributed processing environment compliance service 301 is configured to keep configuration settings and policies for a plurality of distributed processing environments in compliance with master configuration settings and master policies.

According to an embodiment, the distributed processing environment compliance service 301 and the plurality of processing environment compliance services 302 are further configured to keep sub configuration settings and sub policies associated with each distributed processing environment in synchronization with one another.

In another situation, the distributed processing environment compliance service 301 is configured to audit each of the distributed processing environments for compliance with the master configuration settings and the master policies.

Each of the processing environment compliance services 302 are implemented within and resides within a computer-readable storage medium and are to process on one or more processors of the network. Example aspects of each of the processing environment compliance services 302 were discussed above with reference to the methods 100 and 200 of the FIGS. 1 and 2, respectively.

Each processing environment compliance service 302 is configured to manage a particular distributed processing environment and further configured to interact with the distributed processing environment compliance service 301 in order to stay in compliance and to enforce compliance on each distributed processing environment.

According to an embodiment, the distributed processing environment compliance service 301 and each of the processing environment compliance services 302 are also configured to interact with an identity service to enforce identity-based security on each of the distributed processing environments.

FIG. 4 is a diagram depicting interactions between components of a cloud control management system, such as cloud control management system 300 of the FIG. 3 (discussed above).

Interaction of the components and processing scenarios are now provided in detail with reference to the FIG. 4.

A collection of hardware at a hardware layer (depicted as A) includes storage depicted as C. Processing occurs at B and networking occurs at E. B also depicts a virtualization layer.

The combination of A and B provides an Infrastructure as a Service (IaaS) architecture, where workloads can be deployed.

The techniques presented herein and above provide for a master CMDB at K, which is configured to hold configurations and policies for the construction, management, and deployment of workloads so that all workloads deployed within the overall network are controlled by the definitions of the CMDB and such that an IaaS vendor has reliable and verifiable assurance of the manner in which the workloads are created, deployed, managed, and configured for use within F.

The techniques presented herein also provide for the utilization of Cloud Security Service (CSS), which is shown at M.

The techniques also permit mini-clouds (identified as Customer A-C Mini-Clouds in the FIG. 4) to be controlled and policies expressed in the CMDB such that M. is also constrained by IaaS policies and configuration.

Mini-clouds can be created by introducing the CSS as shown at N, O, and P whereby the CSS in the mini-cloud provides annexation and jurisdictional boundaries specific to the mini-cloud.

The techniques also provide for the cooperation of the CMDB's within the mini-cloud shown at V, W, and X, such that the CMDB's in the mini-clouds have a dependency on the CMDB at K, so that, while the mini cloud CMDB controls the creation, deployment, management, etc., the mini-cloud is also constrained by the CMDB at K. Thus, IaaS policies and configurations are also enforced. The mini-cloud CMDB is also separately and independently constrained by the enterprise's data center CMDB at T.

The techniques also provide for trust relationships to be specified between mini-clouds because of the opportunity to create those trust relationships between N and M; O and M; P and M; and thus, between N and O; etc. So, the techniques provide for a constrained trust relationship within F, such that workloads within each mini cloud and their cooperation between mini clouds are controlled by policy and configuration in each of the various CMDB's, but more importantly controlled by strictures defined in the master CMDB at K, which provides policy and configuration oversight enforcement.

The techniques also provide for customer data centers to be integrated into F. In an embodiment, customer A has a fully defined customer data center such that a CMDB exist at T, a data repository at R, identity information at U, policy and certificate management at S, and access to the CSS in the appropriate mini-cloud at Q.

In an embodiment, the CMDB at T is coordinated with the CMDB at V, such that changes in V, X, and/or W are kept in synch with T. V is constrained by the settings and policies maintained in T. Additionally, should any changes in V, X, and/or W violate what is in the IaaS CMDB K, then an audit event is raised and such a change may not be permitted depending on policy. Similarly, changes between K and V, X, and W are separately and independently synchronized but changes to V are not necessarily synchronized with T. Again, should any change in V violate what is in T then an audit event can be raised and depending on policy that change may not be permitted. In this manner, an IaaS provider via K and an enterprise via T can separately control the configuration settings and policies in the mini-cloud CMDB's V when conflicts occur in K or T audit events are raised and the changes not permitted, according to policy.

In an embodiment, the CMDB at T and CMDB at V have different schemas and there is a mapping schema between the two such that the pertinent information between the data center and the mini-cloud are expressed and transformations between the two are defined.

In an embodiment, the schemas between V and K are different and there is a mapping schema that allows the CMDB at V to be normalized with the CMDB at K in a similar manner. Thus, there exists a schema between the two such that pertinent information between the CMDB are expressed and transformations between the two are defined.

In an embodiment, the CMDB at T and V and K are managed in such a way that any changes to any of T, V, and/or K, as per policy and configuration stipulations, are always monitored and tracked so that the mini cloud becomes a natural extension of the data center and its policies and at the same time also conforms with all the configuration and policy of the IaaS. Again, when conflicts arise audit events are raised and the changes may be prohibited.

In an embodiment, a customer data center may include only portions of what was described above, such as Z and Y, the CMDB exist solely in the mini-cloud but the jurisdictional marshaling and annexation previously disclosed occurs through O and Y, as constrained by the relationship between the CMDB at W and K, which has the same relationship and transformation schema definition as described previously.

In an embodiment, the customer data center may include only browser or client access methods such as that which is shown at 1. In this case, the mini-cloud is accessed via P and all repository data, identity data, etc. are held in the mini-cloud but is constrained by the CMDB policies and configuration constraints as shown at X.

In an embodiment, changes to any of the CMDB's such as that at (T and V and K) or (W and K) or (X and K) are propagated between the appropriate CMDB as controlled by aggregate policy and configurations expressed within each of the CMDB's. In this case, the aggregation is approved by policies and configurations in all CMDB's in order for any change to be made.

In an embodiment, multiple IaaS environments cooperating to rationalize and coordinate via the CMDB's at K.

In an embodiment, the various IaaS environments have CMDB schemas, which are different in which case the same mechanism described earlier concerning relationship mappings in a schema between the schemas and a transformation mapping are provided to unify the various IaaS environments ZZ, which further provides for the unification of various customer mini clouds even though they are spread across disparate Infrastructure as a Service environments.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
managing resources of workloads through a configuration repository and when at least two resources communicate via a specific protocol defining that protocol in a setting within the configuration repository, and wherein managing further includes managing processing loads, memory loads, storage loads, and processing capabilities for each processing environment associated with the workloads, and wherein managing further includes permitting each processing environment to independently manage the workloads associated with that processing environment as long as independent management remains in compliance with the configuration repository; and
interfacing the resources and the workloads via settings defined in the configuration repository.

2. The method of claim 1 further comprising, obtaining a policy assigned to at least one of the resources and performing an action defined in the policy when the at least one of the resources is accessed.

3. The method of claim 2, wherein enforcing further includes overriding enforcement of at least one policy based on a different policy appearing at a higher level within the hierarchy of policies from that which the at least one policy appears.

4. The method of claim 1 further comprising, obtaining a hierarchy of policies relevant to the resources and enforcing each of the policies against the resources.

5. The method of claim 1 further comprising, obtaining security policies from the configuration repository and configuring each infrastructure associated with each of the resources with security enforcement in accordance with a particular security policy for that infrastructure.

6. The method of claim 1 further comprising, interfacing infrastructure configuration repositories associated with infrastructures of each of the resources with the configuration repository.

7. The method of claim 6, wherein interfacing further includes overriding policies defined in the infrastructure configuration repositories when those policies conflict with particular policies defined in the configuration repository.

8. The method of claim 6 further comprising, synchronizing at least some policies in the infrastructure configuration repositories with particular policies defined in the configuration repository.

9. The method of claim 6 further comprising, raising an audit even when at least one policy in the infrastructure configuration repositories conflict with at least one particular policy defined in the configuration repository.

10. The method of claim 6 further comprising, mapping policies defined in the infrastructure repositories represented in a first format to other policies defined in the configuration repository represented in a second format, wherein the first format and the second format are disparate formats from one another.

11. A method, comprising:
automatically interfacing a data center configuration repository associated with distributed infrastructures with infrastructure configuration repositories for each of the distributed infrastructures; and
automatically managing the distributed infrastructures as a data center through the interfaced configuration repositories, wherein automatically managing further includes defining a specific protocol between at least two distributed resources when those resources communicate with one another, the specific protocol defined by a setting in the data center configuration repository, and wherein automatically managing further includes managing processing loads, memory loads, storage loads, and processing capabilities for each distributed infrastructure, wherein automatically managing further includes permitting each data center to independently manage the distributed infrastructure associated with that data center as long as independent management does remains in compliance with the data center configuration repository.

12. The method of claim 11, wherein automatically interfacing further includes translating schema definitions defining the infrastructure configuration repositories to data center definitions defining the data center configuration repository.

13. The method of claim 11, wherein automatically interfacing further includes sharing at least one data center resource accessible from a data center infrastructure with each of the distributed infrastructures.

14. The method of claim 11, wherein automatically interfacing further includes overriding policies defined in the infrastructure configuration repositories when those policies conflict with data center policies defined in the data center configuration repository.

15. The method of claim 11, wherein automatically interfacing further includes configuring security policies defined in the data center configuration repository within each of the distributed infrastructures.

16. The method of claim 11, wherein configuring further includes defining audit events to be raised within each of the distributed infrastructures when the security policies are violated within the distributed infrastructures.

17. The method of claim 11, wherein managing further includes receiving notifications from each of the distributed infrastructures when conflicts between policies of the data center configuration repository conflict with other policies of the infrastructure configuration repositories.

18. The method of claim 17, wherein receiving further includes directing an automated action to be processed within the distributed infrastructures in response to the notifications relevant to the conflicts.

19. A system, comprising:
a data center server; and
a plurality of distributed processing environments configured to be accessible over a network; wherein the data center server is configured to:
i) interface the distributed processing environments with one another, ii) manage the distributed processing environments as a single data center processing environment through a configuration repository, and manage processing loads, memory loads, storage loads, and processing capabilities for each distributed processing environment, and permit each distributed processing environment to independently manage an infrastructure of that distributed processing environment as long as independent management remains in compliance with the configuration repository, and iii) defining a communication protocol that at least two resources are to process to communication with one another from different ones of the distributed processing environment through a setting defined in the configuration repository.

20. The system of claim 19, wherein the data center server is further configured to:
iv) override any policy conflict that occurs between one or more of the distributed processing environments and the configuration repository.

* * * * *